United States Patent
Hishon et al.

(10) Patent No.: US 7,140,571 B2
(45) Date of Patent: Nov. 28, 2006

(54) ELECTRIC SEAT BELT RETRACTOR SYSTEM

(75) Inventors: Michael K. Hishon, New Baltimore, MI (US); Samuel D. Engler, Clarkston, MI (US); Krzysztof W. Karwaczynski, Sterling Heights, MI (US)

(73) Assignee: Autoliv, ASP, Inc., Ogden, UT (US)

( * ) Notice: Subject to any disclaimer, the term of this patent is extended or adjusted under 35 U.S.C. 154(b) by 188 days.

(21) Appl. No.: 10/459,353

(22) Filed: Jun. 11, 2003

(65) Prior Publication Data

US 2004/0251366 A1 Dec. 16, 2004

(51) Int. Cl.
*B65H 75/48* (2006.01)

(52) U.S. Cl. ............................ 242/390.8; 280/807

(58) Field of Classification Search ............ 242/390.8, 242/390.9; 280/806, 807; 297/475, 476, 297/477, 478
See application file for complete search history.

(56) References Cited

U.S. PATENT DOCUMENTS

| | | | |
|---|---|---|---|
| 2,204,579 A * | 6/1940 | De Armond et al. .... 242/390.9 |
| 3,182,923 A | 5/1965 | Botar |
| 4,261,530 A | 4/1981 | Asai et al. |
| 4,489,804 A | 12/1984 | Kamijo |
| 4,511,097 A | 4/1985 | Tsuge et al. |
| 4,529,143 A | 7/1985 | Kanada et al. |
| 4,534,441 A | 8/1985 | Kamijo et al. |
| 4,546,933 A | 10/1985 | Kanada et al. |
| 4,570,872 A | 2/1986 | Tsujimura et al. |
| 4,588,144 A | 5/1986 | Nishimura |
| 4,597,587 A | 7/1986 | Yoshitsugu et al. |
| 4,616,141 A | 10/1986 | Hollowell |
| 4,669,680 A * | 6/1987 | Nishimura et al. ......... 280/807 |
| 4,676,444 A | 6/1987 | Nishimura et al. |
| 4,714,274 A | 12/1987 | Nagashima |
| 4,741,491 A * | 5/1988 | Andersson et al. |
| 4,741,556 A | 5/1988 | Nagashima |
| 4,966,394 A | 10/1990 | Thomas et al. |
| 4,974,876 A | 12/1990 | Svensson et al. |
| 4,978,087 A | 12/1990 | Tauber |
| 5,005,777 A | 4/1991 | Fernandez |
| 5,181,739 A * | 1/1993 | Bauer et al. ............... 280/807 |
| 5,277,373 A | 1/1994 | Morton |
| 5,294,066 A | 3/1994 | Lacour |
| 5,316,233 A | 5/1994 | Hiramatsu |

(Continued)

FOREIGN PATENT DOCUMENTS

DE 37 21 923 7/1988

(Continued)

*Primary Examiner*—William A. Rivera
(74) *Attorney, Agent, or Firm*—Sally J Brown (57) ABSTRACT

An electric retractor extracts and retracts a seat belt in response to tension in the seat belt. The electric retractor may include a spool rotatably attached to a retractor frame. A seat belt is wound on the spool. The spool is rotated by a motor via a worm gear system that permits limited axial motion of the worm, but generally prevents the motor from being back-driven by tension in the seat belt to prevent forced seat belt extraction. The gear system may also cut off power to the motor in the event of excessive seat belt tension to prevent further payout of the seat belt. A senses tension in the seat belt and activates the motor to retract or extract the seat belt from the retractor. An emergency control system may override the web guide control in response to abnormal vehicle dynamics to provide reversible pre-crash pretensioning and/or crash pretensioning.

30 Claims, 6 Drawing Sheets

U.S. PATENT DOCUMENTS

| | | |
|---|---|---|
| 5,328,120 A | 7/1994 | Schmid |
| 5,395,066 A | 3/1995 | Yokoyama et al. |
| 5,505,399 A | 4/1996 | Schmid et al. |
| 5,529,258 A | 6/1996 | Dybro et al. |
| 5,558,370 A * | 9/1996 | Behr ............... 242/390.8 |
| 5,611,497 A | 3/1997 | Krambeck et al. |
| 5,725,174 A | 3/1998 | Kothmeier |
| 5,765,774 A | 6/1998 | Maekawa et al. |
| 5,890,672 A | 4/1999 | Alexander, III et al. |
| 6,305,145 B1 | 10/2001 | Suolahti |
| 6,726,249 B1 | 4/2004 | Yano et al. |
| 2001/0025735 A1 | 10/2001 | Midorikawa et al. |
| 2002/0180201 A1 | 12/2002 | Nye et al. |

FOREIGN PATENT DOCUMENTS

| | | |
|---|---|---|
| DE | 37 27 929 | 1/1989 |
| EP | 0 800 970 | 12/2001 |
| GB | 1 210 323 | 10/1970 |
| GB | 2 292 304 | 2/1996 |
| GB | 2 312 827 | 11/1997 |
| JP | 62 275861 | 11/1987 |

* cited by examiner

ELECTRIC SEAT BELT RETRACTOR SYSTEM

BACKGROUND OF THE INVENTION

1. Field of the Invention

The present invention relates to seat belt systems designed to protect the occupants of a vehicle during a collision. More specifically, the invention relates to an electric seat belt retractor system which is uniquely capable of protecting an occupant during normal use, pre-crash situations, and crash situations, and is capable of constantly and dynamically adjusting to the positioning of the occupant.

2. Description of Related Art

A "control system" may be defined as a system in which an operation is to be performed (or omitted) in a manner determined by measuring some characteristic of the system. Thus, efficient operation of the system can be maintained despite relatively unpredictable changes in the system. The present invention has application to a wide variety of control systems.

There are many applications in which it may be desirable to monitor and/or automatically adjust the tension in a flexible member. One such application is safety restraints for protecting vehicle occupants from impact. Such restraints are often known as "seat belts."

Seat belts are known to increase the safety of occupants in motorized vehicles. Seat belt use is often cited as the most useful line of defense in reducing accident related injuries. Legislation requiring manufacturers to include seat belts in their vehicles has been in place for many years. More recently, laws have been enacted requiring consumers to use seat belts.

The benefits of seat belt use are numerous. In a collision, seat belts may prevent the occupant of a vehicle from striking the interior of the vehicle or other objects within the vehicle, including other occupants. Seat belts aid in keeping the occupant inside the vehicle during a roll-over or other accident situation to enhance the probability of survival and injury avoidance. Seat belts may also keep the driver behind the wheel and in control of the vehicle prior to an impending or potential collision, averting additional damage or injuries. Seat belts also enhance the effectiveness of other safety devices. For example, in a vehicle with airbags, a seat belt keeps the occupant in the seat so that the airbag can better protect the occupant.

Seat belts vary in their configuration, but one common type of seat belt is the three point safety harness. A three point safety harness includes a lap belt and a shoulder strap that cooperate to anchor an occupant on each side of his/her lap and at one shoulder. In one commonly employed three-point safety harness configuration, the seat belt webbing traverses the occupant's upper body in a diagonal fashion, passes through a latch plate, and then traverses the occupant's lap. The latch plate is fastened to a buckle, which is secured to the vehicle to restrain both the occupant's lower and upper body. One end of the webbing is typically anchored to the vehicle. The other end is secured by a seat belt retractor.

For convenience and due to variations in seat position and occupant size, three point safety harnesses are usually adjustable to provide proper safety and comfort. A seat belt retractor allows the safety harness to be adjustable and to lock the webbing in the event of an accident. Conventional seat belt retractors include webbing anchored at one end to a spool. Rotation of the spool is controlled for extraction and retraction of the webbing by a combination of various ratchet wheels, springs, lock dogs, pawls, gears, and the like.

Preferably, in a three-point safety harness, the shoulder strap rests lightly on the occupant's shoulder and allows the occupant's upper torso relatively free movement. However, many occupants fail to properly adjust the tension in the safety harness once the seat belt has been fastened. If too much slack is left in the shoulder strap portion of the webbing, the shoulder seat belt system may not properly protect the occupant. Therefore, seat belt retractors have been designed to automatically remove excess slack from the shoulder strap. Generally, this is done by providing a constant bias on the spool in the direction of webbing retraction. However, in actual application, seat belt systems usually contain substantial slack, often 120 mm or more. This is clearly not ideal in that the slack can defeat the effectiveness of the seat belt in a crash situation.

In addition, removal of slack can often cause the occupant discomfort. This discomfort may cause an occupant to use the seat belt improperly, for example, by placing the shoulder portion behind their upper torso, or by simply not using the seat belt. The safety features of the three-point safety harness are defeated when discomfort leads occupants to misuse or avoid using the system.

Generally, the difficulty with existing seat belt systems can be summarized as inability to adequately and dynamically adjust to the position of the occupant. An ideal seat belt system should be able to restrain an occupant comfortably during normal operation. This, however, requires constant adjustment because the occupant is constantly mobile, moving and reaching about the interior of the vehicle. Conventional systems are unable to freely and constantly adjust and often result in uncomfortable binding if the occupant makes a substantial move.

Furthermore, most conventional systems are unable to adequately respond to pre-crash situations. Most existing systems simply lock the belt in place, but are unable to draw the occupant back into position. Many such systems are unable to provide crash pretensioning to restrain the occupant during an actual crash, and to allow optimum interaction with airbags and other supplemental restraint systems.

Hence, conventional seat belt systems are lacking in a number of respects, and a need exists for enhanced seat belt systems that overcome the shortcomings of the prior art. More generally, there is a need for control systems capable of adjusting the available length of a flexible member depending on tension present within the member. Conventional control systems generally lack the ability to dynamically and accurately control the tension. There is a need for control systems capable of controlling tension, particularly in the presence of relatively unpredictable factors such as the motion of a vehicle passenger.

SUMMARY OF THE INVENTION

The present invention has been developed in response to the present state of the art, and in particular, in response to problems and needs in the art that have not yet been fully solved by currently available control systems. According to one implementation of a control system according to the invention, an electric seat belt retractor is controlled based on sensing tension in the seat belt to provide powered extraction and retraction of the seat belt. In addition, the electric seat belt retractor provides pre-crash pretensioning, crash pretensioning, and automatic locking, in addition to the existing functions of emergency locking, extraction, and retraction.

The present invention provides an electrical retractor which overcomes many of the limitations of the prior art. The present invention provides constant and dynamic extraction and retraction of the seat belt webbing in order to follow the occupant's motion about the vehicle. This provides substantially increased comfort to the occupant, while at the same time maintaining a high degree of safety and effectiveness.

In the event of a pre-crash situation, a sensor associated with the seat belt system retracts the seat belt webbing until the occupant is in a safe and secure position. This position is maintained in the event of a crash such that the occupant is properly positioned and safely restrained by the seat belt. As an added benefit, the occupant is restrained in a proper position to receive the added protective benefits of an airbag or supplemental restraint system.

In one embodiment, a web guide lever is employed together with a potentiometer or any angular, linear, or photoelectric sensor. Other types of sensors could also be employed such as linear variable displacement transducers (LVDT's), optical sensors, Hall Effect sensors, pressure sensors, piezoelectric or resistance-based load cells, and the like.

The present invention provides a previously unknown type of secondary electromechanical feedback. Servo control is used to greatly improve motor control compared to known motor implementations. More precisely, a sensor may be mounted to an axle of a web guide lever to supply exact information about webbing dynamics. This information allows the servo amplifier to adjust the direction and speed of the retractor motor in a precise manner. Thus, minimum web tension can be achieved in the seat belt system to assure ride comfort as well as rapid response to any fast or slow changes in the webbing configuration.

Thus, in summary, during normal use the system allows the seat belt webbing to be extracted and reduces the force when worn for improved occupant comfort. When the vehicle begins to reach its limits of adhesion due to increased lateral "g" force or excessive vehicle velocity, the motor drives the mechanism described below to retract the seat belt webbing with sufficient force to pull the occupant back more firmly into the seat and to attain a more favorable position for air bag deployment in the event of a crash. The mechanism described below also provides the structural "lock-up" function necessary to support belt loading and restrain the occupant during a crash. In addition, the system of the present invention provides a fail-safe mechanism whereby in the event of the loss of electrical power, the mechanism is locked in place to provide protection to the occupant.

The electric seat belt retractor of the present invention provides automatic extraction and retraction of the seat belt and other safety features using a unique mechanical configuration. The electric seat belt retractor of the present invention includes a gear assembly which may include a spool, a worm wheel, and a worm. The spool is rotatable about an axis within a retractor frame. A seat belt is connected to and wound around the spool. The worm wheel is coaxially connected to one end of the spool axis. The worm, connected to a drive shaft, operably engages the worm wheel. Rotation of the drive shaft rotates the worm which drives the worm wheel about the spool axis. The drive shaft is connected to the retractor frame such that the drive shaft is rotatable and axially slidable.

The electric seat belt retractor also includes a motor coupled to the drive shaft for rotating the drive shaft. The motor is electrically connected to a circuit which activates and deactivates the motor to extract and retract the seat belt in response to tension in a portion of the seat belt which extends from the spool. In response to a rapid extraction force applied to the seat belt, a torque is created in the worm wheel that forces the worm wheel to slide the worm and drive shaft together axially until the worm contacts a switch that cuts power to the motor and prevents further extraction.

The electric seat belt retractor may include a spring around the drive shaft between a connector for the drive shaft and the worm such that the spring biases the worm and drive shaft against axial movement toward the connector in response to torque created in the worm wheel when the occupant pulls against the seat belt. The torque is in the direction of seat belt extraction. The spring arrests translation of the worm when the spring bias becomes equal to the torque to keep the worm and drive shaft in operable engagement with the worm wheel. Preferably, once the worm contacts the switch, the worm remains engaged with the worm wheel to prevent further rotation of the worm wheel in the direction of seat belt extraction.

The electric seat belt retractor may also include a tension sensor in communication with the seat belt. As mentioned above, the tension sensor may be any type of sensor which provides the necessary characteristics for operation of the system. The tension sensor is in electrical communication with the circuit. In response to changes in tension in the seat belt, the tension sensor activates the motor to retract or extract the seat belt from the electric seat belt retractor. Preferably, the tension sensor comprises an arm pivotally connected near a belt opening of the retractor where the seat belt exits the retractor. The arm is sized and positioned to extend over the belt opening. The unattached end of the arm includes a webbing passage through which a portion of the seat belt passes. The arm pivots between substantially covering the belt opening and about a ninety degree angle with respect to the belt opening in response to changes in tension in the seat belt. Preferably, the arm is biased toward the belt opening by a spring.

When the seat belt of the present invention is used, the occupant pulls the seat belt to insert the latch plate into engagement with the buckle. This pull increases tension in the seat belt. The increased tension causes the arm to pivot outward from the belt opening, toward the ninety-degree position. In response, the tension sensor activates the motor to pay out seat belt webbing. Once the tension in the seat belt returns to a lower level, for example, due to release of the seat belt or engagement of the latch and the buckle, the reduced tension and the bias of the tension sensor towards the belt opening causes the tension sensor to activate the motor to retract the seat belt. As the seat belt is retracted, the tension in the seat belt increases. Increasing the tension causes the arm to pivot to form an angle of about forty-five degrees with the belt opening. Once the arm is positioned at about forty-five degrees, the tension sensor deactivates the motor. When the arm is positioned at about forty-five degrees, a comfortable amount of tension is present in the seat belt.

In certain embodiments, the electric seat belt retractor includes one or more systems which override the tension sensor in order to provide additional safety features. For example, an automatic locking system may activate or deactivate based on the number of rotations of the spool to prevent overextension of the seat belt. When the automatic locking system is activated, the tension sensor is overridden by the automatic locking system which activates the motor for retraction but prevents extraction. Similarly, an emergency control system may override the tension sensor to provide reversible pre-crash pretensioning and/or crash pretensioning in response to sensors that track certain vehicle dynamics such as pitch, yaw, panic braking, loss of traction, dramatic steering wheel movement, and the like.

In view of the foregoing, the electric seat belt retractor provides substantial advantages over conventional systems. The electric seat belt retractor senses the tension in the seat belt such that a constant bias in the direction of retraction is unnecessary. The worm wheel and sliding worm and drive shaft provide a safety lock which prevents unintentional extraction of the seat belt. Conventional locking pawls and ratchet wheels are unnecessary. Together with a simple emergency control unit and automatic locking system, the seat belt retractor provides enhanced seat belt take-up with comparatively fewer components. Stated more generally, the present invention provides enhanced structures and method for accurately controlling tension within a flexible member.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–6, wherein like parts are designated by like numerals throughout. The members of the present invention, as generally described and illustrated in the Figures, may be constructed in a wide variety of configurations. Thus, the following more detailed description of the embodiments of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, electromechanical and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "directly attached to" refers to a form of attachment by which the attached items are either in direct contact, or are only separated by a single connector, adhesive, or other attachment mechanism. The term "abutting" refers to items that are in direct physical contact with each other, although the items may not be attached together.

The structures, methods, and principles of the present invention are applicable to a wide variety of control systems, and more specifically to systems in which the tension of a flexible member is to be dynamically adjusted or kept constant. The following disclosure focuses on automotive safety, and more specifically, on an enhanced seat belt system. The elements outlined below may be readily adapted to other control systems through the application of knowledge available in the art.

Figure 1:
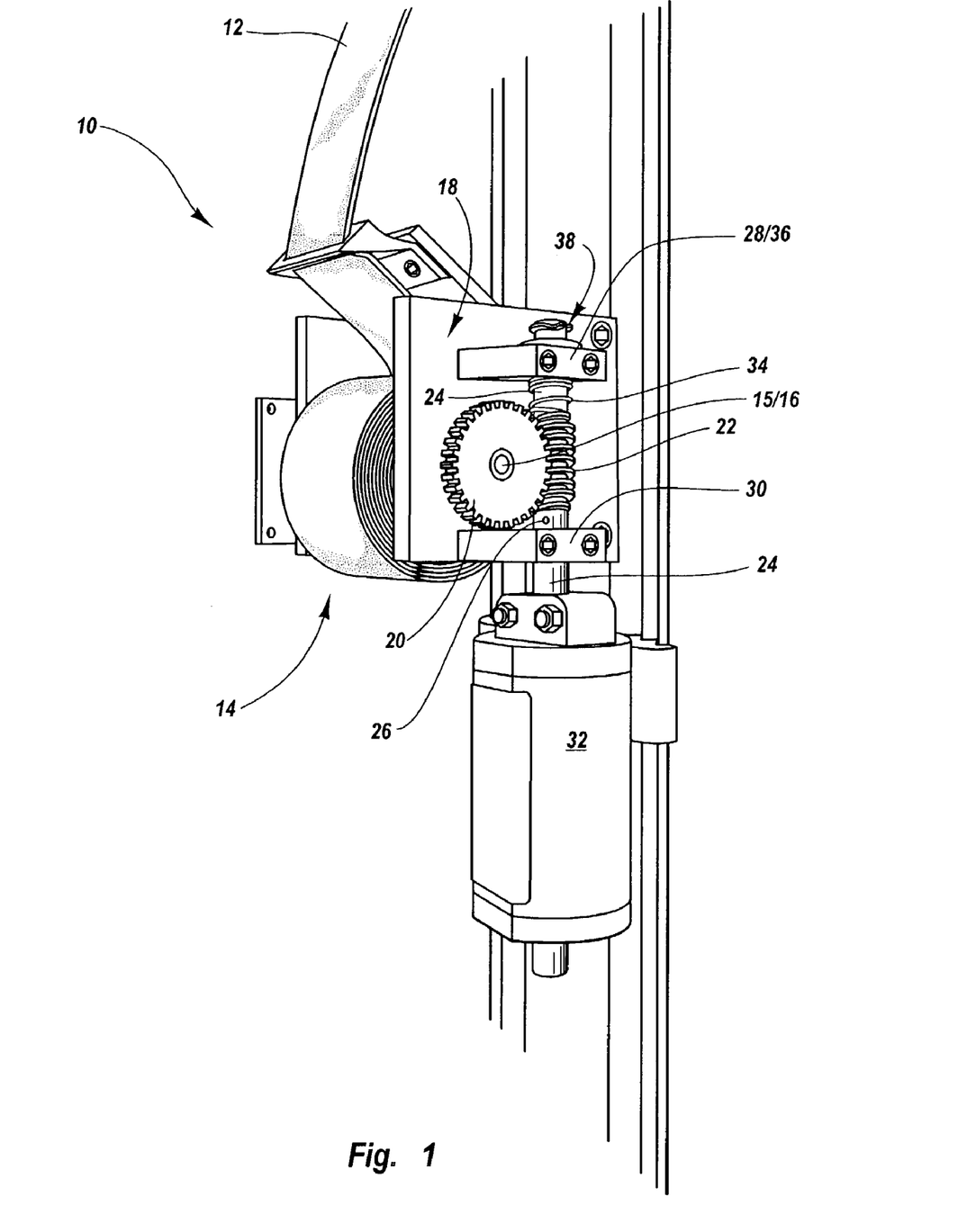
FIG. 1 is a perspective view of one embodiment of an electric seat belt retractor.

With reference to FIG. 1, there is illustrated a perspective view of an electric seat belt retractor 10. The electric seat belt retractor 10 is shown in a configuration corresponding to installation of the retractor 10 on a B-pillar of a vehicle (not shown) for a shoulder seat belt system. The retractor 10 can be installed in other locations of a vehicle. For example, the retractor 10 may be installed beside a rear seat for use in a lap and/or a shoulder seat belt system. The retractor 10 may be used with a variety of lap, shoulder, and/or four or five point seat belt systems.

The electric seat belt retractor 10 includes a seat belt 12. The seat belt 12 is seat belt webbing of about two inches in width and a length determined by factors such as the type of seat belt system using the retractor 10, the position of the retractor 10 in the vehicle, and the size of the seat (not shown). Generally, one end of the seat belt is anchored to the vehicle outside the retractor 10. As mentioned above, the remainder of the seat belt 12 may be threaded through a latch plate or buckle and a D-ring before being connected to the retractor 10.

Generally, the retractor 10 adjusts the seat belt 12 by paying out or retracting the seat belt 12 as needed. A rewind spring (not shown) is generally used to pay out or retract the seat belt 12. In the retractor 10, excess seat belt webbing 12 is taken up by the rewind spring connected to a spool 14 around which the seat belt webbing 12 is wound to form a take-up mechanism. An axle 15 of the spool 14 rotates about an axis 16 secured within a retractor frame 18. Preferably, the spool 14 rotates to pay out and retract the seat belt 12 in response to the needs of an occupant.

To rotate the spool 14, an input gear is connected to the spool 14. The input gear may take the form of a worm wheel 20 is connected coaxially to one end of the spool 14. The worm wheel 20 operably engages an input gear, which may take the form of a worm 22. Rotation of the worm 22 in one direction drives the worm wheel 20 to rotate the spool 14 to pay out the seat belt 12. Rotation of the worm 22 in the other direction rotates the worm wheel 20 which rotates the spool 14 to retract the seat belt 12.

The size and configuration of the worm wheel 20 and worm 22 may vary based on the seat belt system used with the retractor 10. Using a worm wheel 20 and worm 22 to drive the spool 14 provides high torque for extraction and retraction of the seat belt 12. In one embodiment, the gear ratio between the worm wheel 20 and worm 22 is 30:1. Alternatively, the number of teeth on the worm wheel 20 and worm 22 may be varied to provide different gear ratios.

In one embodiment, the worm 22 is fixed to a drive shaft 24. Preferably, the worm 22 is connected such that rotation of the drive shaft 24 rotates the worm 22 and the worm 22 will not move laterally with respect to the drive shaft 24. In certain embodiments, rather than being connected, the worm 22 and drive shaft 24 may be formed from a single piece of material.

The worm 22 may be connected to the drive shaft 24 using various mechanical connectors. For example, the worm 22 may be secured by one or more set screws 26. Alternatively, pins (not shown) may pass through the shaft and engage the worm 22 to allow rotation and prevent lateral movement of the worm 22 with respect to the drive shaft 24. Furthermore, the worm 22 may be welded to the drive shaft 24. The worm 22 is positioned along the drive shaft 24 to operably engage the worm wheel 20.

Preferably, the drive shaft 24 is connected by a first connector 28 and a second connector 30 to the retractor frame 18. Alternatively, a single connector 28 may be used. The retractor frame 18 serves as a base 31 for the connector 28, 30. The connectors 28, 30 are configured to secure the drive shaft 24 to the frame 18 but still allow the drive shaft 24 to rotate and slide laterally within the connectors 28, 30.

In certain embodiments, the connectors 28, 30 are pillow blocks. The pillow blocks may be secured to the retractor frame 18 by screws or bolts. The pillow blocks may include bearings (not shown) between the drive shaft 24 and a race (not shown) of the pillow block. The bearings facilitate rotational and lateral movement of the drive shaft 24 within the pillow blocks.

Referring still to FIG. 1, the retractor 10 includes a motor 32. The motor 32 is coupled to the drive shaft 24 to rotate the drive shaft 24 in either direction. Preferably, the motor 32 is a DC motor. The motor 32 is electrically coupled to a circuit (discussed in more detail below) which activates and deactivates the motor 32 in response to tension in a portion of the seat belt 12 which extends from the spool 14.

Because the worm 22 and drive shaft 24 move together laterally, in order for the rotating worm 22 to drive the worm wheel 20, the worm 22 is held laterally stationary. Preferably, the worm 22 is positioned on the drive shaft 24 such that the worm 22 abuts the second connector 30. Thus, when the worm 22 rotates in the direction to retract the seat belt 12, the second connector 30 prevents the worm 22 from screwing past the worm wheel 20 so that the worm 22 drives the worm wheel 20. Similarly, when the worm 22 rotates in the direction for paying out the seat belt 12, the first connector 28 may laterally hold the worm 22 and drive shaft 24 for the worm 22 to drive the worm wheel 20.

In a preferred embodiment, the retractor 10 includes a compression spring 34 positioned around the drive shaft 24 in a space between the worm 22 and the first connector 28. The spring 34 holds the worm 22 in operable engagement with the worm wheel 20 for driving the worm wheel 20 when paying out the seat belt 12.

Generally, a worm 22 and worm wheel 20 gear system can not be "back-driven." Therefore, a driving force for the system should operate to rotate the worm 22, not the worm wheel 20. If the worm wheel 20 experiences a torque (referred to herein as "back-drive torque"), teeth of the worm wheel press against the teeth of the worm 22 and, due to the difference in angles between the teeth on the worm wheel 20 and worm 22, the driven worm wheel 20 moves the worm 22 laterally along its axis, instead of rotating.

This back-drive torque provides lock up for the retractor 10 to prevent rapid extraction of the seat belt 12 such as during an emergency. As illustrated in FIG. 1, the seat belt 12 is wound around the spool 14, and the worm 22 engages the worm wheel 20 such that emergency extraction introduces a counter-clockwise torque on the worm wheel 20. Alternatively, the seat belt 12, spool 14, worm 22 and worm wheel 20 may be arranged such that emergency extraction introduces a clockwise torque on the worm wheel 20.

Preferably, a back-drive torque is introduced when the seat belt 12 is extracted by an external force. When the worm wheel 20 experiences the back-drive torque, the worm wheel 20 slides the worm 22 and drive shaft 24 towards the first connector 28. The drive shaft 24 passes through the first connector 28 and the worm 22 contacts and compresses the spring 34 against the first connector 28. Alternatively, a spring 34 may not be used and the worm 22 may contact the first connector 28 directly. The first connector 28 serves as a stop 36. When the spring 34 is compressed, the first connector 28 prevents further lateral movement of the worm 22 and drive shaft 24. When the worm 22 abuts the compressed spring 34 and stop 36, the worm 22 preferably maintains engagement with the worm wheel 20. Thus, the retractor 10 is locked to prevent further seat belt 12 extraction.

Generally, the back-drive force rotates the worm wheel 20 a minimal distance in a counter-clockwise direction before the spool 14 is locked. The spool 14 remains locked so long as the back-drive torque is greater than the bias force of the spring 34. When the back-drive torque is released, or decreased below the bias force of the spring 34, the spring 34 moves the worm 22 and drive shaft 24 back to a normal operating position with respect to the worm wheel 20 and the motor 32 is activated to retract or extract the seat belt 12 as needed. The retractor 10 is unlocked.

As used herein, "extraction force" refers to a force which causes seat belt 12 extraction at a rate greater than the extraction rate caused by regular use of the seat belt 12. Generally, regular extraction forces are minimal and do not cause the worm 22 and drive shaft 24 to move laterally before the retractor 10 responds by driving the worm 22 in the direction to pay out the seat belt 12. The extraction force, referred to herein, occurs when a vehicle experiences an accident or extreme conditions leading to a possible accident such as panic braking, swerving, or the like.

In certain embodiments, the retractor 10 includes a switch 38 in electrical communication with the electrical circuit (discussed below) which powers and operates the motor 32 of the retractor 10. The switch 38 provides an additional safety feature to ensure that when spool 14 is locked, the motor 32 can not be activated in the direction of seat belt 12 extraction. The switch 38 may also serve as a sensor to detect when the retractor 10 has been locked in an emergency.

Preferably, the switch 38 is secured to the first connector 28 such that as the drive shaft 24 slides through a passage (not shown) in the connector 28, the drive shaft 24 activates the switch 38. The switch 38 may be a microswitch which is closed under normal conditions and opened by the lateral movement of the drive shaft 24. When the switch 38 is closed, the circuit is provided with an operational flow of power for activating the motor 32. When the switch 38 is open, the power flow is interrupted such that the motor 32 can not be activated to pay out the seat belt 12 and defeat the locking of the spool 14. Once the retractor 10 unlocks, the spring 34 slides the worm 22 and drive shaft 24 back into normal operational position which causes the drive shaft 24 to close the switch 38 and restore power flow in the circuit to the motor 32.

In addition to locking the spool 14, the electric seat belt retractor 10 should pay out and retract the seat belt 12 based on the actions of the occupant. These actions may be determined by sensing the amount of tension present in the portion of the seat belt 12 which extends from the retractor 10. For example, as an occupant buckles a latch plate to a buckle, the tension in the seat belt 12 increases. Once the seat belt 12 is buckled or unbuckled, the tension decreases. In addition, as an occupant moves their upper torso while buckled in the seat belt 12, the tension in the seat belt changes once again.

Figure 2A:
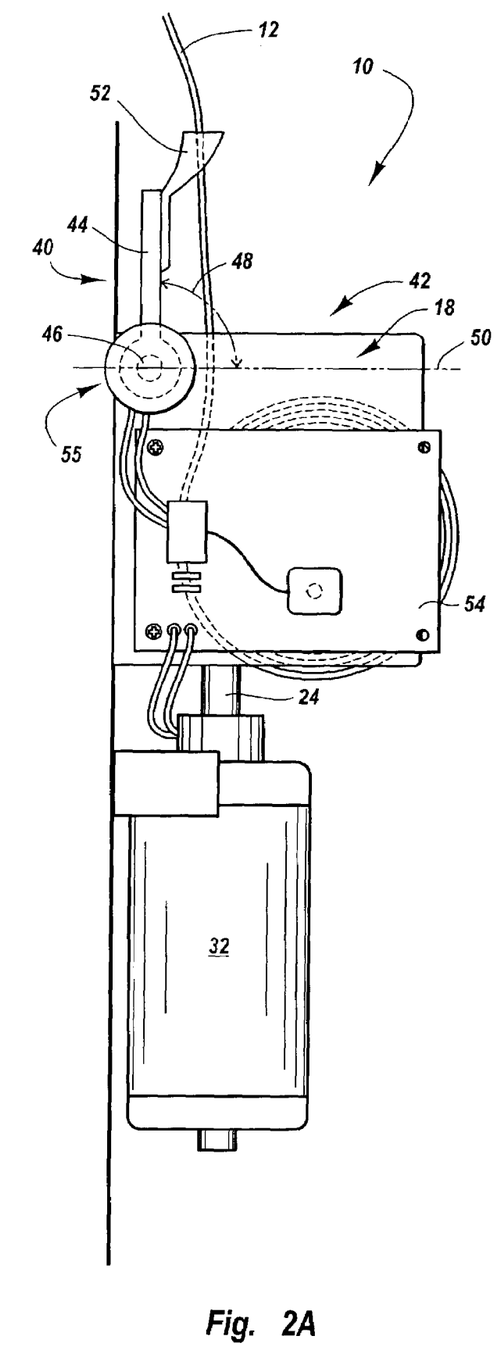
FIG. 2A is a side view of a tension sensor of an electric seat belt retractor detecting maximum tension in the seat belt.

Referring now to FIG. 2A, the retractor 10 includes a tension sensor 40. The tension sensor 40 measures tension in the seat belt 12 between the retractor 10 and the other end of the belt 12. Based on the tension, the retractor 10 may be controlled to retract or extract the seat belt 12 as necessary. Preferably, the tension sensor 40 is connected to the retractor frame 18. Alternatively, the tension sensor 40 may be positioned at other locations along the length of the seat belt 12 extending from the spool 14 of the retractor 10.

Generally, the retractor frame 18 comprises a frame which is anchored to a vehicle. One side of the retractor frame 18 comprises the belt opening 42. The belt opening 42 is where the seat belt 12 extends from the frame 18. The seat belt 12 is extracted and retracted from the spool 14 through the belt opening 42. The belt opening 42 may be of various sizes. For example, the belt opening 42 may comprise one whole side of the frame 18. Alternatively, the belt opening 42 may be of a minimal size that still allows the seat belt 12 to be extracted and retracted.

In one embodiment, the tension sensor 40 serves as a web guide that orients and untwists the seat belt 12 before the seat belt 12 is wound around the spool 14. In addition, the tension sensor 40 may serve as a door that opens and closes the belt opening 42 in response to the level of tension in the portion of the seat belt 12 extending from the retractor 10.

The tension sensor 40 includes an arm 44 which extends over the belt opening 42. The arm 44 is sized to substantially cover the belt opening 42. The arm 44 is pivotally connected to the retractor frame 18 at one side of the belt opening 42. The arm 44 may be connected by various pivoting mechanisms. For example, the pivot 46 may comprise an axle 47 (Seen in FIG. 5) which passes through the arm 44 and is secured to opposite sides of the frame 18.

The pivot 46 allows the arm 44 to pivot through an angle 48 measured between the arm 44 and a reference line 50 indicated generally by the belt opening 42. When the arm 44 pivots to substantially cover the belt opening 42, the angle 48 is about zero degrees. Generally, the pivot 46 allows the arm 44 to pivot freely to form an angle 48 between about zero degrees and about ninety degrees. Alternatively, based on the position and orientation of the tension sensor 40, the angle 48 may range between about zero degrees and about one-hundred and eighty degrees. Of course different configurations may allow for still different angle ranges.

The unconnected end of the arm 44 includes a webbing passage 52. The extended portion of the seat belt 12 is threaded through the webbing passage 52. Preferably, the seat belt 12 is wound on the spool 14 such that the seat belt 12 exits the spool 14 and extends from one end of the arm 44 to the other end, the webbing passage 52. In this manner, tension between where the seat belt 12 winds around the spool 14 and a portion of the seat belt 12 which is threaded through the webbing passage 52 causes the arm 44 to pivot about the pivot 46. When high tension is present in the seat belt 12, the arm 44 is extended away from the belt opening 42, creating an angle 48 of about ninety degrees. When very low or minimal tension is present, the arm 44 substantially covers the belt opening 42 and creates an angle of about zero degrees. In certain embodiments, the arm 44 may include a torsional spring 53 (shown in FIG. 5) which is loaded when tension in the seat belt 12 extends the arm 44. The torsional spring 53 may bias the arm 44 towards the retractor frame 18 when the seat belt tension is minimal.

By sensing the tension, the tension sensor 40 is capable of controlling the retractor 10 to activate and/or deactivate the motor 32 to retract or extract the seat belt 12 as necessary. The tension sensor 40 is in electrical communication with an electrical circuit (See FIG. 4) for powering and controlling the retractor 10. Components for the electrical circuit may be secured to a circuit board 54 connected to the retractor frame 18. The tension sensor 40 measures the tension in the seat belt 12 by measuring the position of the arm 44 with respect to the belt opening 42 and translating this position into voltage which is delivered to the motor 32.

In one embodiment, a potentiometer 55 may be used to perform the translations. For example, an axle of a rotary potentiometer 55 may be coupled to the pivot 46 of the tension sensor 40 such that movement of the arm 44 moves a wiper in the potentiometer 55 to vary the level of power provided to the circuit. Preferably, the potentiometer 55 varies the level and polarity of voltage across the potentiometer 55 made available to the circuit.

In other embodiments of the invention, the sensor 40 need not be an angular sensor, but may rather be a linear sensor or some other type of sensors. Thus, in place of the arm 44, an element that translates or moves in a manner different from angular or linear motion may be used. In fact, the sensor 40 need not have any moving elements, but may utilize a sensor that detects relative position, motion, or tension through the use of optical, magnetic, or other intangible effects. In place of the potentiometer 55, a wide variety of sensors, including Hall effect probes, linear variable displacement transducers (LVDT's), magnetic readers, optical readers, piezoelectric or resistance-based load cells, and the like may be used.

Referring again to FIG. 2A, when a predetermined level of tension exists in the seat belt 12, the seat belt 12 moves the arm 44 to an extended position forming an angle 48 of about ninety degrees. The predetermined level of tension may be the amount of tension present when the seat belt 12 is buckled and in normal use. In one embodiment, with the arm 44 between about forty-five degrees and ninety degrees, the potentiometer 55 provides a positive voltage which activates the motor 32 to turn the worm 22 in the direction to pay out the seat belt 12. Preferably, the voltage level increases as the arm 44 moves from about a forty-five degree angle 48 to about a ninety degree angle 48. Thus, as the arm 44 moves towards the ninety degree angle 48, the motor 32 speeds up proportionally until the maximum pay out speed for the motor 32 is reached.

Figure 2B:
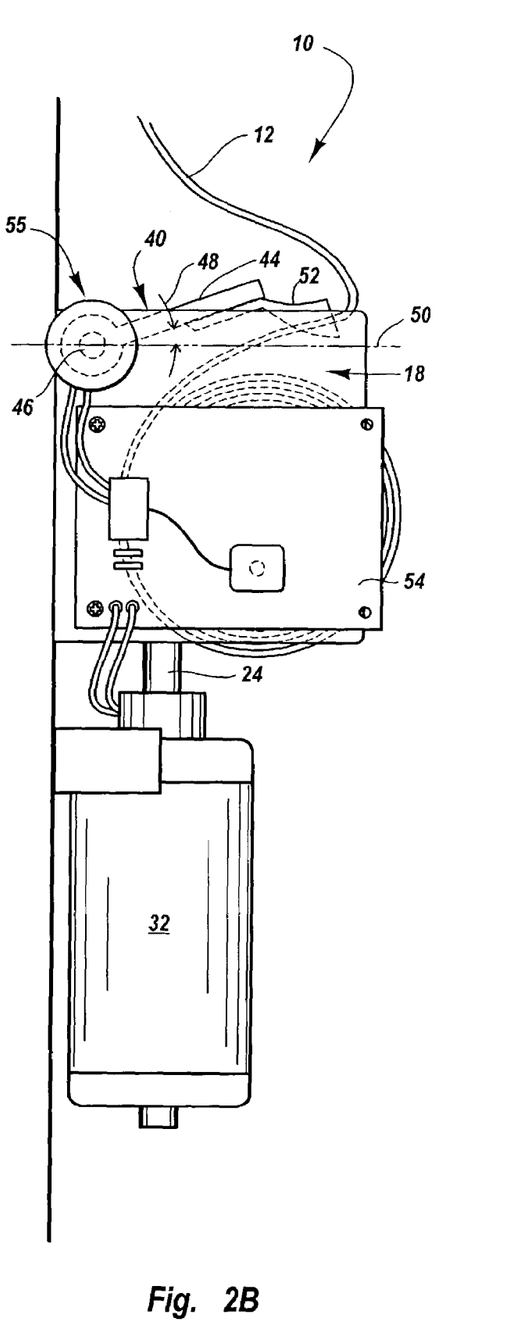
FIG. 2B is a side view of a tension sensor of an electric seat belt retractor detecting minimal tension in the seat belt.

Referring now to FIG. 2B, when minimal or no tension exists in the seat belt 12, the arm 44 moves towards the retractor frame 18. As mentioned above, the arm 44 may be moved by gravity or a torsional spring 53 (See FIG. 5). When the arm 44 forms an angle 48 of between about forty-five degrees and about zero degrees, the potentiometer 55 provides a negative voltage which activates the motor 32 to turn the worm 22 in the direction to retract the seat belt 12 onto the spool 14. Similarly, the potentiometer 55 gradually provides more negative voltage as the angle 48 approaches zero, until the motor 32 reaches a maximum retraction speed.

Referring back to FIG. 2A, as the motor 32 retracts the seat belt 12, tension is again introduced into the portion of the seat belt passing through the tension sensor 40. The tension causes the arm 44 to extend. As the arm 44 extends, the negative voltage decreases until the potentiometer 55 fails to provide either negative or positive voltage to the motor 32. Thus, the circuit provides no power to the motor 32. The motor 32 is deactivated. Preferably, during normal use, the motor 32 is deactivated when the tension sensor 40 forms about a forty-five degree angle 48, as seen in FIG. 1.

The tension sensor 40 allows the retractor 10 to be controlled for paying out and retracting the seat belt 12 in response to the tension in the seat belt 12. In addition, any slack introduced in the seat belt 12 by, for example, the occupant first buckling the seat belt 12 or moving his/her upper torso, is automatically removed based solely on the tension detected by the tension sensor 40. Those of skill in the art recognize that the polarity of the voltage for paying out or retracting the seat belt 12 may be reversed from that described above. Furthermore, the angles 48 used to describe deactivation and activation of the motor 32 for retraction and extraction are illustrative. Of course, the tension sensor 40 may provide the activation voltages or no voltage when the arm 44 forms other angles 48 in response to tension in the seat belt 12. For example, no voltage may be provided by the tension sensor 40 when a sixty degree angle 48 is formed.

In conventional retractors, slack in the seat belt 12 is constantly removed by a bias on the seat belt 12 in the direction of seat belt retraction. The bias is created by a coil spring in communication with the spool which is loaded when the seat belt is extracted and recoils once the seat belt is latched or released. The recoil of the coil spring creates a constant tension, or bias, in the seat belt in the direction of retraction. This constant bias can be uncomfortable for the occupant.

In contrast, the tension which raises the arm 44 to about forty-five degrees is tension which may be unnoticeable to the occupant. The amount of tension felt in the seat belt 12 when the arm 44 is at forty-five degrees, is affected by the effect of gravity on the arm 44 and any bias provided by a torsional spring 53 on the arm 44 at the pivot 46. Therefore, the amount of tension in the seat belt 12 when the retractor 10 is deactivated may be adjusted by varying the bias of the torsional spring 53, weight of the arm 44, or orientation of the potentiometer 55 with respect to the pivot 46.

Figure 3A:
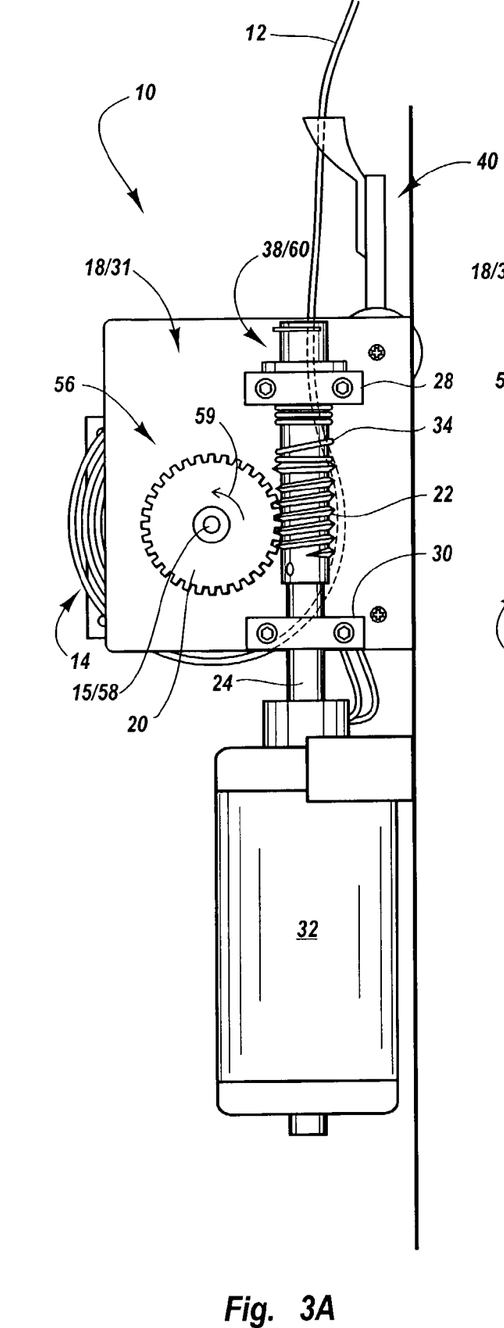
FIG. 3A is a side view of a worm gear drive system used in one embodiment of an electric seat belt retractor which is locked due to torque in the worm wheel.

FIG. 3A illustrates a side view of one embodiment of a gear drive system 56 for the present invention. The basic operation of the gear drive system 56 is described above in relation to FIG. 1. FIG. 3A illustrates the gear drive system 56 in which back-drive torque may be introduced by rapid extraction of the seat belt 12. However, the gear drive system 56 may be used in other applications which introduce a back-drive torque, for example to determine when a powered system is overloaded.

As discussed above, the gear drive system 56 includes a worm wheel 20, drive shaft 24, motor 32 and worm 22 fixed to the drive shaft 24. The drive shaft 24 is secured by one or more connectors 28, 30, such as pillow blocks, which allow rotational and axial movement of the drive shaft 24. The connectors 28, 30 are connected to a base 31 such as a retractor frame 18.

The worm wheel 20 is coupled to a load 58. In the illustrated embodiment, the load 58 is the rotatable axle 15 of a seat belt retractor spool 14. Operation of the gear drive system 56 in response to a back-drive torque (indicated by arrow 59) introduced by extraction of the seat belt 12 is discussed above. However, different loads 58 may be coupled to the worm wheel 20. For example, a rack (not shown) for a power window system of a vehicle may be coupled to the worm wheel 20.

If during operation of the motor 32 to move the load 58, an overload condition exists, the gear drive system 56 automatically deactivates to prevent damage to system components and/or users. An overload condition, as used herein, refers to a condition in which the load 58 is impeded or abnormally accelerated in some manner contrary to normal movement. This overload condition creates a back-drive torque 59 in the worm wheel 20.

For example, in response to the back-drive torque 59, the worm 22 screws past the worm wheel 20 and moves the drive shaft 24 laterally. Lateral movement of the drive shaft 24 may be controlled by a compression spring 34. If the overload condition creates a back-drive torque 59 greater than the bias of the spring 34, the laterally moving drive shaft 24 may be used to stop the system. The sliding drive shaft 24 may activate a switch 38 to interrupt power to the motor 32 and deactivate the system 56. The switch 38 may act as a sensor 60 for detecting an overload condition for the system 56.

In FIG. 3A, the gear drive system 56 is illustrated in an overload condition. The drive shaft 24 has moved axially in response to a back-drive torque created in the worm wheel 20. The switch 38 has been activated and power to the motor 32 is interrupted stopping rotation of the drive shaft 24.

Figure 3B:
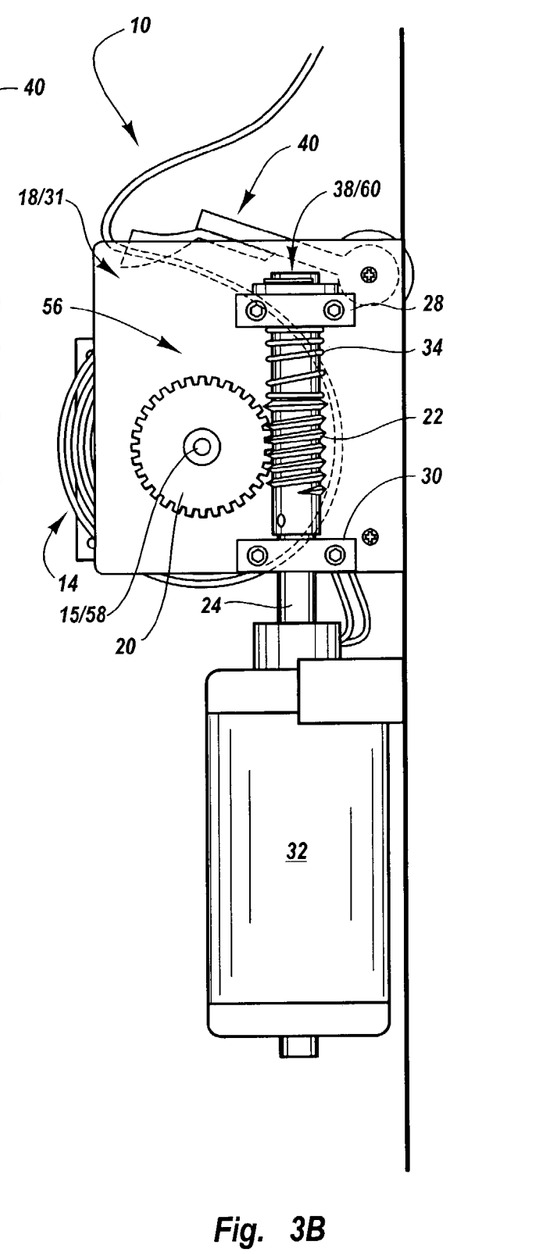
FIG. 3B is a side view of a worm gear drive system used in one embodiment of an electric seat belt retractor during normal operation.

Referring now to FIG. 3B, if the overload condition is resolved, by reducing or removing the back-drive torque 59, the switch 38 is deactivated to restore power to the motor 32. The worm 22 and drive shaft 24 are returned to a normal position. The system 56 may then continue normal operation under control of the tension sensor 40.

Figure 4:
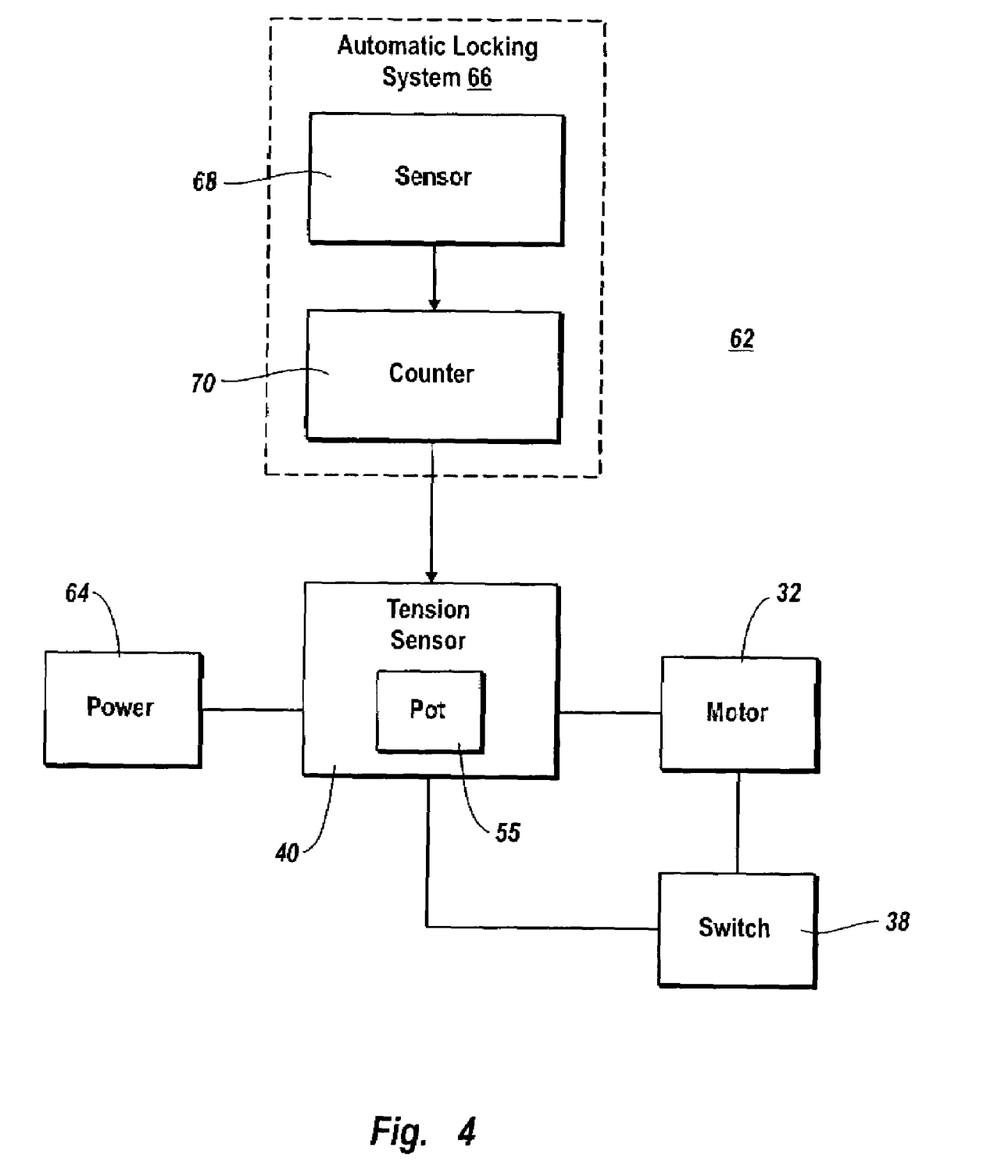
FIG. 4 is a functional block diagram for a circuit of one embodiment of an electric seat belt retractor that provides automatic locking functionality.

Referring now to FIG. 4, a functional diagram of an electrical circuit 62 for operating an electric retractor 10 is illustrated. The circuit 62 may comprise a variety of configurations. For example, the components may be connected in series, parallel or some combination of these. The circuit 62 may also include various electrical components which are well known and have been omitted for clarity.

The circuit 62 includes the switch 38, the motor 32 and the tension sensor 40. The tension sensor 40 is electrically coupled to a power source 64. Preferably, the power source 64 is the same power source for the electrical system of a vehicle. In one embodiment, the tension sensor 40 includes a potentiometer 55 which regulates the magnitude and polarity of the voltage provided to the motor 32 based on tension in the seat belt 12. If tension in the seat belt 12 causes the retractor 10 to lock, the drive shaft 24 activates the switch 38 which opens the circuit 62 and stops power flow to the motor 32. If the tension is released and the drive shaft 24 returns to within normal ranges, the switch 38 is closed and power is restored to the motor 32.

In certain embodiments, the electric retractor 10 comprises an automatic locking system 66. The automatic locking system 66 is a system which retracts the seat belt 12 onto the spool 14 and does not permit the seat belt 12 to be extracted until the automatic locking system 66 is deactivated. With the automatic locking system 66 activated, an occupant is not able to extract additional seat belt webbing.

The automatic locking systems 66 may be used when fastening child safety seats using a regular seat belt system (lap or shoulder). The automatic locking system 66 is activated when a predetermined amount of seat belt webbing 12 has been extracted from the retractor 10. This predetermined amount may be referred to as an activation threshold. Similarly, the automatic locking system 66 is deactivated when a predetermined amount (a deactivation threshold) of seat belt webbing 12 has been retracted onto the spool 14 of the retractor 10. Generally, the activation threshold is defined as substantially all of the seat belt 12 being extracted and the deactivation threshold is defined as substantially all of the seat belt 12 being retracted. However, these thresholds may vary.

In one embodiment, the automatic locking system 66 includes a sensor 68 and counting module 70 which cooperate to determine when the activation and deactivation thresholds have been reached. The sensor 68 may be a rotational sensor 68 that detects revolutions of the spool 14. For each rotation, a signal is provided to the counting module 70. The counting module 70 includes an analog circuit that increments a count, for example, through the use of incrementally variable capacitance or resistance, for each rotation in the direction of seat belt extraction and decrements the count for each rotation in the direction of seat belt retractions. When the count reaches or exceeds a number corresponding to the activation threshold, the counting module 70 activates the automatic locking system 66. When the count reaches or falls below a number corresponding to the deactivation threshold, the counting module 70 deactivates the automatic locking system 66.

Once activated, the automatic locking system 66 includes well known electrical components for overriding the normal operation of the tension sensor 40. The automatic locking system 66 then provides power to the motor 32 for retracting the seat belt 12 regardless of the level of tension measured by the tension sensor 40. In certain embodiments, high tension measured by the tension sensor 40 may be used to deactivate the motor 32 and stop retracting the seat belt 12. While activated, the automatic locking system 66 prevents powering of the motor 32 for extraction of the seat belt 12.

Figure 5:
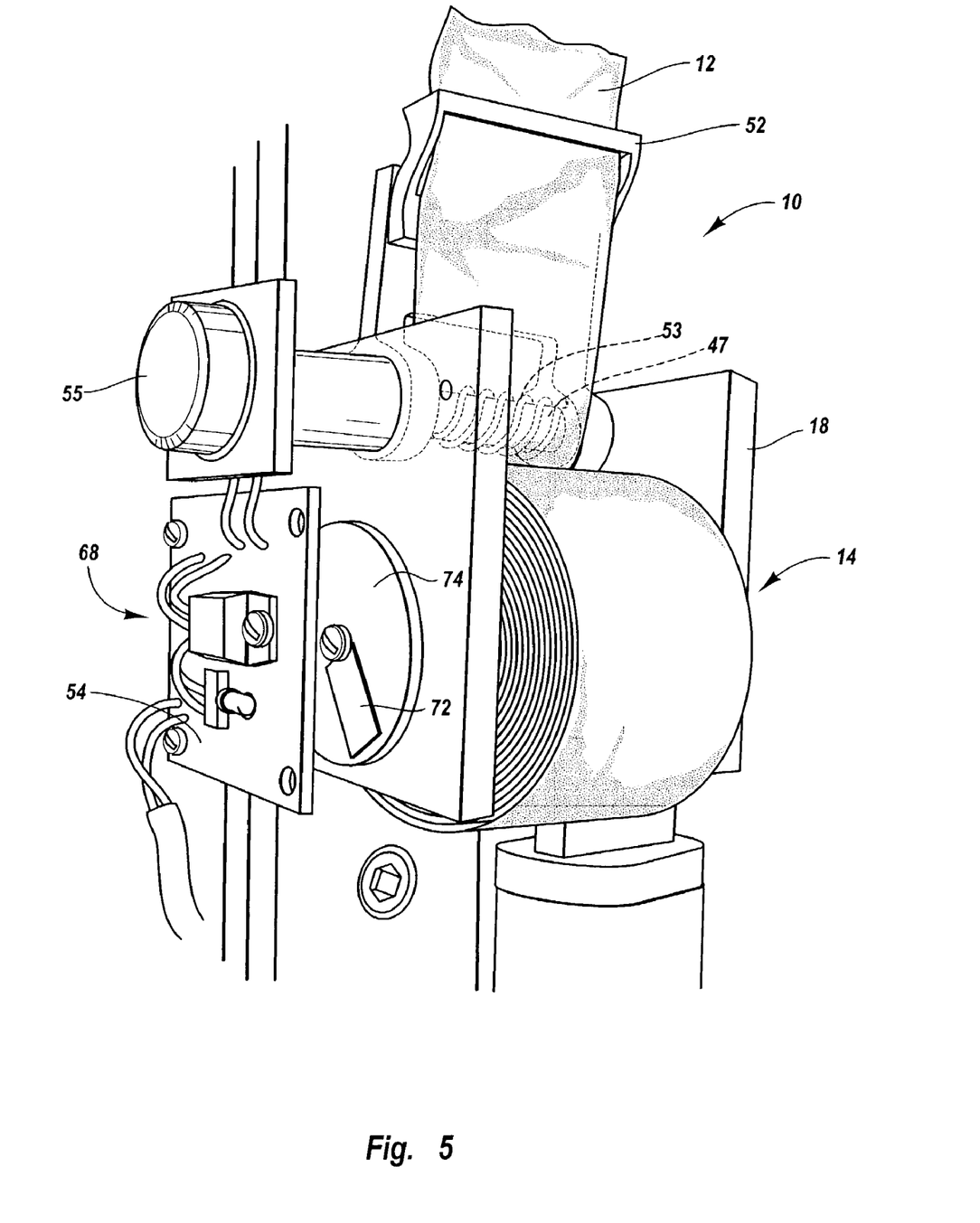
FIG. 5 is a perspective view of components integrated with an electric seat belt retractor to provide automatic locking.

FIG. 5 illustrates one embodiment of an automatic locking system 66 for use with the present invention. The rotational sensor 68 comprises an optical sensor 68 which is activated by a reflector 72 connected to a wheel 74. Alternatively, various mechanical sensors may be used to detect revolutions of the spool 14. The wheel 74 is connected to the spool 14 such that rotation of the spool 14 rotates the wheel 74. The optical sensor 68 may include a pair of lasers, or sub-sensors (not shown), which allow the direction of rotation to be determined by identifying which sub-sensor was activated first. Activation of the sensor 68, sends a signal to the counting module 70 which maintains a count as described above.

Preferably, a seat belt retractor 10 provides pre-crash pretensioning and pretensioning in response to sensors which determine that an accident is very likely to occur or that an accident has occurred. Pretensioning is the intentional retraction of the seat belt 12 into the retractor 10, pre-crash pretensioning, in anticipation of an accident. Generally, pre-crash pretensioning occurs a few seconds prior to an accident. Pre-crash pretensioning is activated by one or more vehicle dynamics. A vehicle dynamic is a measurement of one or more characteristics of the operation of a vehicle. For example, vehicle dynamics may include measurements such as sudden braking, loss of traction, spinning of the vehicle, dramatic changes in the pitch and/or yaw of the vehicle, and other such dynamics of a vehicle. The vehicle dynamics may be affected by the speed of the vehicle, condition of the road, and the like.

Pre-crash pretensioning retracts the seat belt 12 onto the spool 14 to reduce the amount of slack in the seat belt 12. Minimal slack improves the ability of the seat belt 12 to protect the occupant in an accident. In addition, pre-crash pretensioning alerts the occupant that the vehicle dynamics indicate an accident may occur. Such an alert may allow the occupant to take evasive actions such as steering corrections or braking to avoid an accident. Preferably, if the accident is avoided, the seat belt retractor 10 should extract a portion of the seat belt 12 to relieve the tension in the seat belt 12 introduced by the pre-crash pretensioning.

Accident pretensioning is also an intentional rapid retraction of the seat belt 12 into the retractor 10. However, in contrast to pre-crash pretensioning, crash pretensioning is activated when a crash sensor is activated. Accident pretensioning occurs milliseconds into the accident. The purpose of crash pretensioning is to remove any excess slack and to assist in positioning the occupant in the seat such that other safety systems can effectively protect the occupant. For example, using the present invention, activating the worm 22 in the direction to retract the seat belt 12 may be done with such a high torque that the tension introduced into the seat belt 12 can re-position the upper torso of an occupant against the seat. Accident pretensioning may or may not be reversible once the accident event ends.

Figure 6:
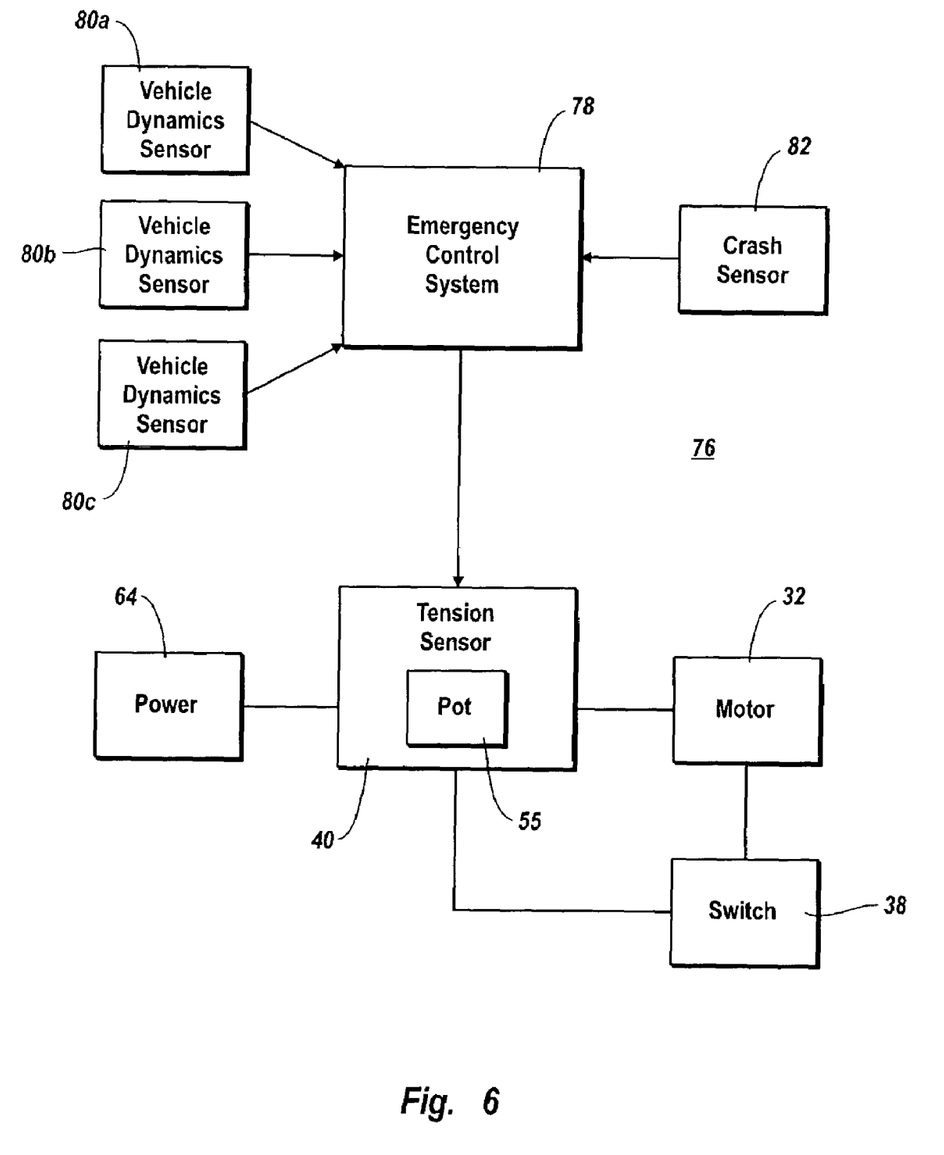
FIG. 6 is a functional block diagram for a circuit of one embodiment which provides pre-crash pretensioning and crash pretensioning in an emergency.

Referring now to FIG. 6, a functional block diagram illustrates a circuit 76 for controlling the electric retractor 10 in an emergency situation to provide pre-crash pretensioning and crash pretensioning. The circuit 76 includes the power source 64, motor 32, switch 38, and tension sensor 40 discussed above.

In addition, the circuit 76 includes an emergency control system 78. The emergency control system 78 may be very simple or complex. In certain embodiments, the emergency control system 78 may be analog and may be integrated with the circuit 76 and with other safety systems of a vehicle such as airbag systems. Alternatively, the emergency control system 78 may include a simple logic module. The emergency control system 78 overrides the tension sensor 40 and activates the motor 32 to retract the seat belt 12 and provide pre-crash pretensioning or pretensioning based on inputs from vehicle dynamics sensors 80.

Preferably, the emergency control system 78 is in electrical communication with a plurality of vehicle dynamics sensors 80, designated 80a–80c, which may be positioned throughout a vehicle. Alternatively, the vehicle dynamics sensors 80 may be integrated with the emergency control system 78. Generally, each sensor 80 measures a single vehicle dynamic. For example, one sensor 80 may comprise an accelerometer for measuring rapid deceleration. The vehicle dynamics sensors 80 may send signals continuously or when the dynamic is outside an acceptable threshold range.

In addition, the emergency control system 78 receives input from a crash sensor 82. A crash sensor 82 is activated when the vehicle experiences an impact during an accident. Of course, other events in the initial stages of an accident may also trigger a crash sensor 82.

Generally, the emergency control system 78 receives inputs from the sensors 80 and/or one or more crash sensors 82. Based on these inputs and an algorithm, the emergency control system 78 determines whether pre-crash pretensioning or crash pretensioning should be activated.

If the vehicle dynamics sensors 80 send signals to the emergency control system 78 and the crash sensor 82 is not activated, pre-crash pretensioning is activated. If the vehicle dynamics sensors 80 stop sending signals or send signals that vehicle dynamics have returned to normal and the crash sensor 82 is not activated, the emergency control system 78 may stop overriding the tension sensor 40. Then, because the pre-crash pretensioning put tension in the seat belt 12, the tension sensor 40 activates the motor 32 to extract the seat belt 12 until the tension sensor 40 detects normal tension in the seat belt 12. In this manner, the pre-crash pretensioning is reversible.

If the vehicle dynamics sensors 80 send signals to the emergency control system 78 and the crash sensor 82 is activated, the emergency control system 78 overrides the tension sensor 40 and activates the motor 32 to provide crash pretensioning. In certain embodiments, the emergency control system 78 may overpower the motor 32 such that a maximum retraction torque available from the motor 32 is used to retract the spool 14. Overpowering the motor 32 may damage the motor 32. However, safety of the occupant is most important and the motor 32 can be repaired or replaced if necessary.

In certain embodiments, the emergency control system 78 may provide pre-crash pretensioning initially followed by crash pretensioning once a crash sensor 82 is activated. Thus, pre-crash pretensioning and crash pretensioning may be provided in stages. The motor 32 allows for pre-crash pretensioning and crash pretensioning without expensive pyrotechnic pretensioners. In addition, the electric retractor 10 of the present invention allows for reversible pre-crash pretensioning in the event that an accident is avoided.

In summary, with reference generally to FIGS. 1–6, the present invention provides an electric retractor 10 for powered extraction and retraction of a seat belt 12. The retractor 10 provides powered extraction and retraction using a simple worm gear drive system 56 (See FIGS. 3A, 3B) which locks in response to a back-drive torque introduced by extraction forces due to rapid extraction of the seat belt 12.

Powered extraction and retraction is controlled by a tension sensor 40 which proportionally activates the motor 32 to retract or extract the seat belt 12 based on the tension present in the seat belt 12. The retractor 10 provides a relatively constant degree of tension on the seat belt while permitting relatively free occupant motion. Furthermore, the retractor 10 provides advanced features such as an automatic locking system 66, reversible pre-crash pretensioning, and crash pretensioning using electronics and emergency control systems 78. The retractor 10 provides the advanced features without pyrotechnic components and with fewer mechanical components than conventional retractors.

More broadly, the present invention provides enhanced structures and methods by which the tension in a flexible member may be accurately controlled. These enhanced structures and methods are applicable over a wide range of applications.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An electric seat belt retractor comprising:

a spool connected to a seat belt wound around the spool, the spool being rotatable about an axis fixed within a retractor frame;

the retractor frame comprising a belt opening at one end of the retractor frame which allows extraction and retraction of the seat belt from the retractor and wherein the tension in the seat belt is measured by a tension sensor in contact with the seat belt, the tension sensor comprising an arm which extends over the belt opening, one end of the arm being pivotally attached to the retractor frame, the other end of the arm being in contact with a portion of the seat belt extending from the belt opening, and wherein the arm pivots in response to tension in the seat belt; and a motor coupled to the spool to rotate the spool, the motor being in electrical communication with a circuit which activates and deactivates the motor to extract and retract the seat belt in response to tension in a portion of the seat belt extending from the spool.

2. The electric seat belt retractor of claim 1, wherein the drive shaft is connected by a first connector and a second connector to the retractor frame and wherein the first connector comprises the stop, the seat belt retractor further comprising a spring around the drive shaft between the first connector and the worm such that the spring biases the worm and drive shaft to place the worm and drive shaft in operable engagement with the worm wheel in response to the torque being less than the bias of the spring.

3. The electric seat belt retractor of claim 2, wherein in response to the torque being greater than the bias of the spring, the worm and drive shaft slide axially and compress the spring against the stop, the retractor further comprising a switch in electrical communication with the circuit and positioned such that sliding the drive shaft in response to the torque activates the switch to prevent power flow within the circuit to the motor.

4. The electric seat belt retractor of claim 3, wherein in response to the arm extending from the belt opening at an angle between about zero and about fort-five degrees, the tension sensor provides power in the circuit which activates the motor to retract the seat belt onto the spool.

5. The electric seat belt retractor of claim 3, wherein in response to the arm extending between about forty-five degrees and about ninety degrees from the belt opening, the tension sensor provides power in the circuit which activates the motor to extract the seat belt from the spool.

6. The electric seat belt retractor of claim 3, wherein in response to the arm extending at about forty-five degrees from the belt opening, the circuit provides no power to the motor.

7. The electric seat belt retractor of claim 3, wherein the tension sensor comprises a potentiometer in electrical communication with the circuit and connected to the arm such that pivoting of the arm determines the level of power provided to the circuit.

8. The electric seat belt retractor of claim 3, wherein the tension sensor comprises a spring which biases the arm towards the belt opening.

9. The electric seat belt retractor of claim 3, wherein the tension sensor comprises a web guide for the electric seat belt retractor.

10. The electric seat belt retractor of claim 1, further comprising a worm wheel coaxially connected to one end of the spool for rotating the spool.

11. The electric seat belt retractor of claim 10, further comprising a worm fixed to a drive shaft, the drive shaft connected to the retractor frame such that the drive shaft is rotatable and axially slidable, the worm being positioned along the drive shaft to operably engage the worm wheel.

12. The electric seat belt retractor of claim 11, wherein in response to an extraction force applied to the seat belt, a torque is created in the worm wheel that forces the worm wheel to slide the worm and drive shaft together axially until the worm contacts a stop, the worm remaining engaged with the worm wheel to prevent further rotation of the worm wheel in the direction of seat belt extraction.

13. An electric seat belt retractor comprising:
a spool connected to a seat belt which is wound around the spool, the spool being rotatable about an axis fixed within a retractor frame;
a motor coupled to the spool to rotate the spool, the motor being in electrical communication with a circuit which activates and deactivates the motor to extract and retract the seat belt in response to tension in the seat belt measured by a tension sensor in direct contact with a portion of the seat belt extending from the spool; and
an automatic locking system in electrical communication with the circuit comprising:
a rotation sensor positioned to detect rotations of the spool,
wherein, in response to the automatic locking system being activated, the circuit activates the motor for seat belt retraction and prevents extraction of the seat belt.

14. The electric retractor of claim 13, wherein in response to the torque on the worm wheel in the direction of extraction being greater than the bias force of the compression spring, the worm wheel forces the worm and drive shaft to slide axially and the worm compresses the compression spring against the first pillow block which prevents further axial movement of the worm and drive shaft and wherein the axial movement of the drive shaft extends the drive shaft past the first pillow block to activate a switch in electrical communication with the circuit such that power to the motor is interrupted.

15. The electric retractor of claim 13, wherein the automatic locking system further comprises a counting module which receives a signal from the rotation sensor for each rotation detected, the counting module being in electrical communication with the rotation sensor and the circuit.

16. The electric retractor of claim 15, wherein the counting module increments a count for each rotation of the spool in the direction for seat belt extraction and decrements the count for each rotation of the spool in the direction of seat belt retraction such that in response to the count reaching an activation threshold the automatic locking system is activated and in response to the count reaching a deactivation threshold the automatic locking system is deactivated.

17. The electric retractor of claim 15, wherein the activation threshold corresponds to substantially all of the seat belt being extracted from the retractor and wherein the deactivation threshold corresponds to substantially all of the seat belt being retracted into the retractor.

18. The electric retractor of claim 15, wherein the electric retractor is installed in a vehicle, the electric retractor further comprising an emergency control system in electrical communication with the circuit such that the emergency control system is capable of overriding the tension sensor and activating the motor to provide pre-crash pretensioning of the seat belt in response to vehicle dynamics.

19. The electric retractor of claim 18, wherein the emergency control system is capable of pretensioning the seat belt in response to activation of a crash sensor in the vehicle.

20. The electric retractor of claim 18, wherein the emergency control system activates the motor to reverse the pre-crash pretensioning in response to vehicle dynamics and a crash sensor not being activated.

21. The electric retractor of claim 18, wherein the emergency control system comprises a vehicle dynamics sensor which detects abnormal vehicle dynamics for the vehicle and signals the emergency control system which responds by activating the motor to retract the seat belt onto the spool to provide pre-crash pretensioning.

22. The electric retractor of claim 21, wherein the emergency control system is in electrical communication with at least one crash sensor, and wherein in response to the at least one crash sensor being activated, the emergency control system activates the motor to retract the seat belt onto the spool to provide crash pretensioning.

23. The electric retractor of claim 22, wherein the motor is activated to provide a maximum retraction torque on the spool available from the motor.

24. The electric retractor of claim 13, further comprising a worm wheel that rotates the spool about the fixed axis, the worm wheel being coaxially connected to one end of the spool.

25. The electric retractor of claim 24, further comprising a drive shaft connected by a first pillow block and a second pillow block to the retractor frame such that the drive shaft is rotatable and axially slidable, a worm fixed to the drive shaft is positioned to operably engage the worm wheel such that rotation of the drive shaft rotates the worm to drive the worm wheel.

26. The electric retractor of claim 25, further comprising a compression spring around the drive shaft between the first pillow block and the worm such that the spring biases the worm restricting the drive shaft from sliding axially in response to an extraction force which generates a torque on the worm wheel in a direction to pay out the seat belt, the torque being less than the bias force of the compression spring.

27. An electric seat belt retractor installed in a vehicle, the electric seat belt retractor comprising:
a spool connected to a seat belt which is wound around the spool, the spool being rotatable about an axis fixed within a retractor frame;
a worm wheel that rotates the spool about the fixed axis, the worm wheel being coaxially connected to one end of the spool;
a rotatable drive shaft having a worm fixed thereto, the drive shaft connected by a first pillow block and a second pillow block to the retractor frame such that the drive shaft is rotatable and axially slidable, the worm being positioned along the drive shaft to operably engage the worm wheel such that rotation of the drive shaft rotates the worm to drive the worm wheel;
a driving means for rotating the drive shaft;
wherein the driving means is in electrical communication with a control means for activating and deactivating the driving means to extract and retract the seat belt in response to a belt detector means for detecting a tension force in a portion of the seat belt extending from the spool by detecting the relative position of the belt detector means with respect to the portion of the seat belt extending from the spool; and a biasing means for preventing the drive shaft from sliding axially in response to torque introduced in the worm wheel by the load which is less than the bias provided by the biasing means.

28. The electric seat belt retractor of claim 27, further comprising a dynamics detector means for detecting a vehicle dynamic and a crash detector means for detecting a vehicle accident situation and an emergency control means in communication with the dynamics detector means and crash detector means, the emergency control means overriding the control means and activating the driving means to retract the seat belt to provide pre-crash pretensioning in response to the dynamics detector means detecting that a vehicle dynamic is outside a threshold range.

29. The electric seat belt retractor of claim 28, wherein in response to the vehicle dynamic returning to within the threshold range and the crash detector means providing no indication of an accident, the emergency control means returns control of the electric seat belt retractor to the control means.

30. The electric seat belt retractor of claim 28, wherein the emergency control means overrides the control means and activates the driving means to retract the seat belt to provide crash pretensioning in response to the crash detector means signaling an accident situation and the dynamics detector means signaling that a vehicle dynamic is outside a threshold range.

* * * * *